United States Patent [19]

Wang

[11] Patent Number: 4,829,470

[45] Date of Patent: May 9, 1989

[54] TEXT FLOW AROUND IRREGULAR SHAPED GRAPHIC OBJECTS

[75] Inventor: John S. Wang, Travis County, Tex.

[73] Assignee: International Business Machines Corp., Armonk, N.Y.

[21] Appl. No.: 808,264

[22] Filed: Dec. 12, 1985

[51] Int. Cl.⁴ .......................... G06F 3/14; G06G 1/06
[52] U.S. Cl. .................................... 364/900; 364/521; 340/721; 340/747
[58] Field of Search ... 364/200 MS File, 900 MS File, 364/518, 521; 340/747, 721; 382/16, 22, 48, 26

[56] References Cited

U.S. PATENT DOCUMENTS

| | | | |
|---|---|---|---|
| 4,110,736 | 8/1978 | Kono | 382/25 |
| 4,588,987 | 5/1986 | Stephens | 340/715 X |
| 4,622,641 | 11/1986 | Stephens | 364/518 |
| 4,646,076 | 2/1987 | Wiedennan et al. | 340/747 |
| 4,688,167 | 8/1987 | Agarwal | 364/200 |
| 4,713,754 | 12/1987 | Agarnal et al. | 364/200 |

FOREIGN PATENT DOCUMENTS 57-174759 10/1982 Japan .
58-33773 2/1983 Japan .

Primary Examiner—Raulfe B. Zache
Assistant Examiner—Thomas L. Lee
Attorney, Agent, or Firm—C. Lamont Whitham; Michael E. Whitham

[57] ABSTRACT

An improved mixed object editor flows text around and into irregularly shaped graphic objects on a page so that all the "white" space on the page is filled. An irregularly shaped window which generally conforms to the shape of the graphic object is first created. Then the boundaries of text lines which intersect the irregularly shaped window are determined. Text is next placed in the available text space.

5 Claims, 4 Drawing Sheets

TEXT FLOW AROUND IRREGULAR SHAPED GRAPHIC OBJECTS

CROSS REFERENCE TO RELATED APPLICATION

This application is related in subject matter to copending patent application Ser. No. 06/645,621 filed Aug. 30, 1984, by Irene H. Hernandez, Barbara A. Barker and Beverly H. Machart for "Flow Attribute for Text Objects", now U.S. Pat. No. 4,723,209, which application is assigned to the assignee of this application and is incorporated herein by reference.

FIELD OF THE INVENTION

The present invention is generally directed to mixed object editors of the type which allows the creation and editing of mixed objects such as text, business graphics, draw graphics and tables on the same page of a document and, more particularly, to an editor which will flow text around and into irregularly shaped graphic objects on a page so that all the "white" space on the page is filled.

DESCRIPTION OF THE PRIOR ART

The above referenced copending U.S. Pat. No. 4,723,209 describes improvements in an application composite editor which facilitates the manipulation of a group of diverse object sets within a single displayable area on a page of a document. The editor works with a page layout philosophy wherein data objects reside on a page and data resides in the data objects. All pages reside within a document object, and some data objects may have additional objects within them. Objects are data specific entities that the user can manipulate on the page. The objects that are within other objects reside within a defined object set boundary. All objects are explicit; i.e., they are recongnizable, choosable entities. Blocks are user selected ranges of any part of the document. For example, a block can be defined as a range of cells in a column or a character string. The block object allows the user to underline character strings, change fonts, or define a "keep" attribute around a group of objects. All objects exist within a specified boundary on the page. For example, a text character exists within the boundary of either a line object set or a paragraph object set; a rectangle exists within the boundary of a graphic object set; and a cell exists within the boundary of a table object set. According to the invention described in the above referenced copending U.S. Pat. No. 4,723,209, object sets may be moved into positions on the page such that more than one object set is occupying a single displayable area on the page. Examples of this are a paragraph flowing around a graphic object set, a table object set next to a graphic object set and a graphic object set in the middle of a paragraph with text flowing left and right. Such an arrangement of objects creates a structure called a superblock.

SUMMARY OF THE INVENTION

It is an object of this invention to provide an improvement in a mixed object editor which allows not only flow of text around but also into irregular shaped graphic objects on a page so that all the "white" space on the page is filled.

According to the present invention, the rectangular window which constitutes the boundary of a graphic object is modified to conform more closely to the shape of the graphic object. To do this, the user selects a "cut" action from the command bar and draws a polyline around the graphic object by selecting a series of points. The system closes the open polyline into a closed polygon if it is not already closed. The resulting polygon window around the graphic object is then used to determine points of intersection with text lines. These points of intersection are used to calculate the lengths of text lines on either side of the polygon window. Text is then allowed to flow up to this new boundary.

BRIEF DESCRIPTION OF THE DRAWINGS

The foregoing and other objects, aspects and advantages of the invention will be better understood from the following detailed description of the preferred embodiment of the invention with reference to the accompanying drawings, in which.

DETAILED DESCRIPTION OF THE PREFERRED EMBODIMENT OF THE INVENTION

Figure 1:
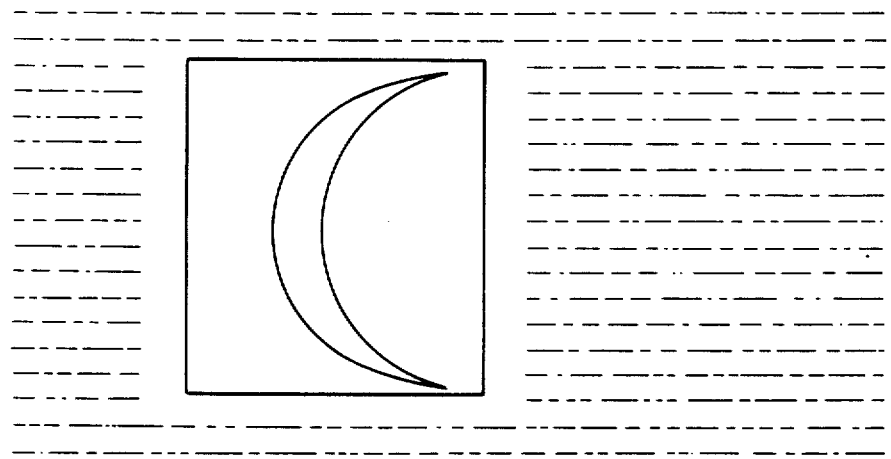
FIG. 1 is an illustration of the text flow around a graphic object within a rectangular window.

In a composite document environment which allows text to flow around a graphic object such as described in the above referenced copending U.S. Pat. No. 4,723,209, a traditional, rectangularly shaped window can not always achieve a desirable text flow layout. In the example shown in FIG. 1, text flows around the half moon graphic object which is defined within a rectangular window. Due to the window boundary, the available text space around the half moon graphic object cannot be used by text.

Figure 2:
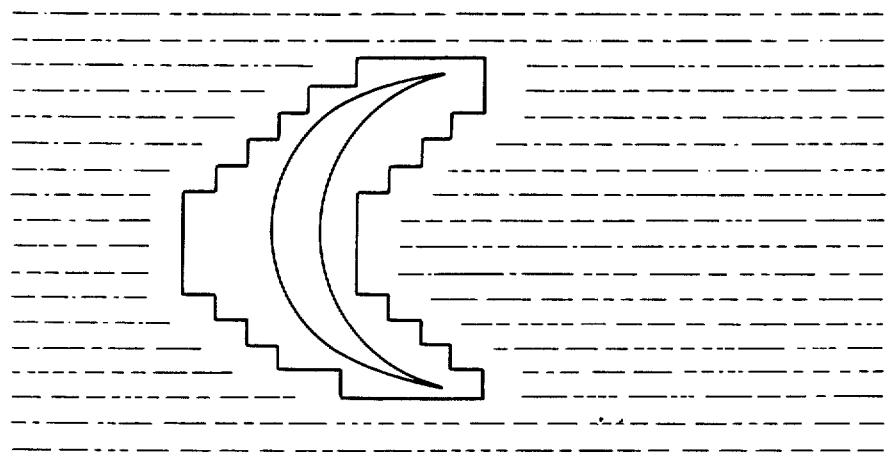
FIG. 2 is an illustration of the text flow in an around the graphic object which is now within an irregularly shaped window.

In order to allow text flow around or into the graphic object, an irregularly shaped window is required. Creating this window can be considered "custom cutting" the rectangular window. First, the traditional, regularly shaped window is defined. Then by using known polyline graphic tools, the window can be cut into any shape the user wishes. Those points which define the new window are then stored within the window data structure. To let text flow around a graphic object is equivalent to computing the area surrounding the graphic object. FIG. 2 shows text flow around the resulting cut window.

Figure 3A:
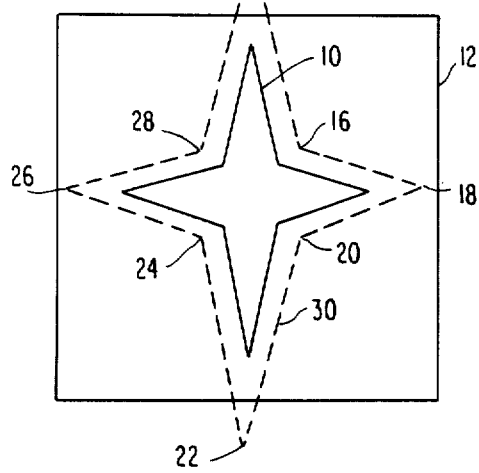
FIGS. 3A and 3B illustrate by way of example how an irregularly shaped window is cut around a graphic object.

The user may define a window of arbitrary shape by selecting a "cut" function from a command bar displayed at the top of the screen. An example of such a command bar may be seen with reference to copending U.S. Pat. No. 4,723,209. After the "cut" action has been selected, the pointing cursor may be changed into a different cursor type, a scissor icon for example, which will indicate to the user that he is in the cutting mode. Actually, the cutting line is a polyline well known in graphics applications. A polyline is considered a single graphic object even though it is defined by a plurality of points. Thus, for example, in FIG. 3A the user may want to cut a window around a star-shaped graphic object 10 which is displayed within a traditional rectangular window 12. The cutting line is defined by moving the cursor to various points on the display and selecting the points by pressing the select button on the cursor positioning device. Assume that the user starts at point 14, he might then go to point 16, followed by points 18, 20, 22, 24, 6, and 28. As he does so, the line "rubber bands" from the last selected point to the cursor until the final point is selected in a manner well known in the computer graphics art. This rubber banding helps the user in defining his cutting outline. Assuming the last point selected is point 28, the system will close the open polyline into a closed polygon by connecting a line between points 28 and 14. Of course, the user may also close the polygon by simply selecting the first point 14 as his last point. The dotted line 30 in FIG. 3A represents the cutting line, and this cutting line may be shown on the display screen in a reserved color or line style to readily distinguish it from the regular graphic objects or window border.

Figure 3B:
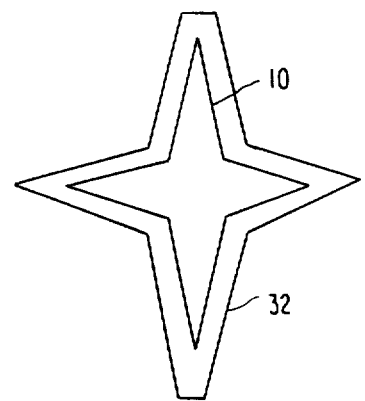

In FIG. 3B, the cutting line 30 is then used to clip the rectangular shape of window 12, and the intersection of the original window 12 and the cutting polygon is the final defined irregularly shaped window 32. Notice in FIG. 3B that the tips of the vertical points of the star-shaped window have been cut off in this process. The points on the window border are stored within the window data structure. To redisplay this window, two steps are required:

Step 1: Display the original rectangular window.
Step 2: Erase the removed portion of the window from the display.

In order to erase the removed portion from the display, all pixels in the area to be erased are changed to the background color. A fast way of doing this is to find the starting and ending point of a horizontal line and draw this line with the background color. Computation can start from the top left corner (x,y) of the window 12. All the intersections of the y line to every edge of the cutting line 30 are computed and the resulting x coordinates are stored in an array. This array is then sorted into increasing order. The first and the second entries in the array define an area that belong to the removed portion. The second and third entries of the array define an area that belong to the remaining portion. That is, the area from an odd entry to an even entry is the erase area, and the area from an even entry to an odd entry is the remaining area. It alternates like this until the end of the array is reached. Starting from the top of the window and ending at the bottom of the window, by examining the x coordinate array, every pixel within the window 12 will be examined. After the removed portion of the window is erased from the display, the space remaining can be used.

Figure 4:
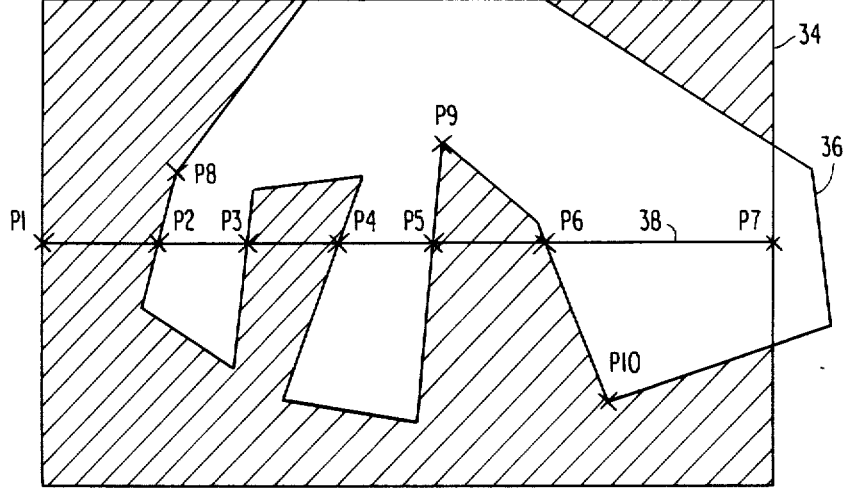
FIG. 4 shows an irregularly shaped window which has been cut by cutting a polygon.

As a further example, consider FIG. 4 which shows a window 34 which has been cut by cutting polygon 36. Line 38 has seven intersections with both the window 34 and the polygon 36 between the left edge and the right edge of the window. Lines between $P_1$ and $P_2$, $P_3$ and $P_4$, and $P_5$ and $P_6$ belong to the removed portion. Lines between $P_2$ and $P_3$, $P_4$ and $P_5$, and $P_6$ and $P_7$ belong to the remaining portion. The shaded area is the removed portion. This "odd-even" algorithm is a simple way to determine what portion of the original rectangular window is to be removed.

In order for the "odd-even" algorithm to work properly, special consideration must be given to the situations where the horizontal line 38 intersects the polygon 36 at one or more joints. By a "joint", what is meant is the intersection of two edges of the polygon. The problem is that although the polyline that generated the polygon is treated as a single graphic entity, each edge of the polygon is stored as a separate line with starting and ending points. Thus, the intersection of line 38 with a joint of the polygon will normally produce the result that there are two intersections rather than one. One of these intersections will be ending point of one edge, and the other will be the starting point of the next edge. This result can produce erroneous results using the "odd-even" algorithm.

Consider for example such points as $P_8$, $P_9$ and $P_{10}$. Point $P_8$ should be treated differently from points $P_9$ or $P_{10}$, otherwise the "odd-even" erase line algorithm will give the wrong result. To avoid this, the following definitions are used:

1. Define "special joint" as the joint of two edges such that the next adjacent points to the end points of these edges are vertically below or above the end points. Points $P_9$ and $P_{10}$ are examples of "special joints". If horizontal lines 38' and 38" are drawn through these joints, it will be observed that the "odd-even" algorithm produces the correct result realizing that the intersections with these two points are each treated as two intersections rather than one.

Figure 5A:
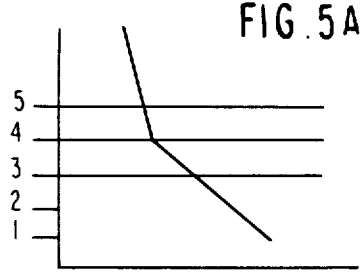
FIGS. 5A and 5B show the elimination of one pixel at a normal joint in a graphic outline.
Figure 5B:
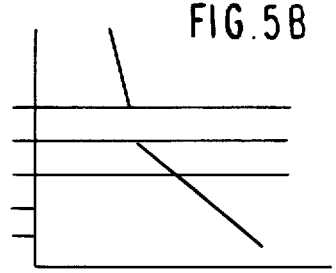

2. Define "normal joint" as the joint of two edges such that the next adjacent points to the end points of these edges are vertically above and below the joint. Point $P_8$ is an example of a "normal joint". In this case the intersection of a horizontal line with the joint should not be treated as two intersections because this will produce a wrong result using the "odd-even" algorithm. At all the normal joints, only one intersection should be used. An easy way to eliminate one intersection at a normal joint is to short the line one pixel above the normal joint so that only one intersection can be generated. An example of this is shown in FIGS. 5A and 5B. FIG. 5A shows a normal joint, and FIG. 5B shows one edge which forms the normal joint shorted by one pixel. Thus, the intersection of a horizontal line at the joint will produce only one intersection.

Figure 6:
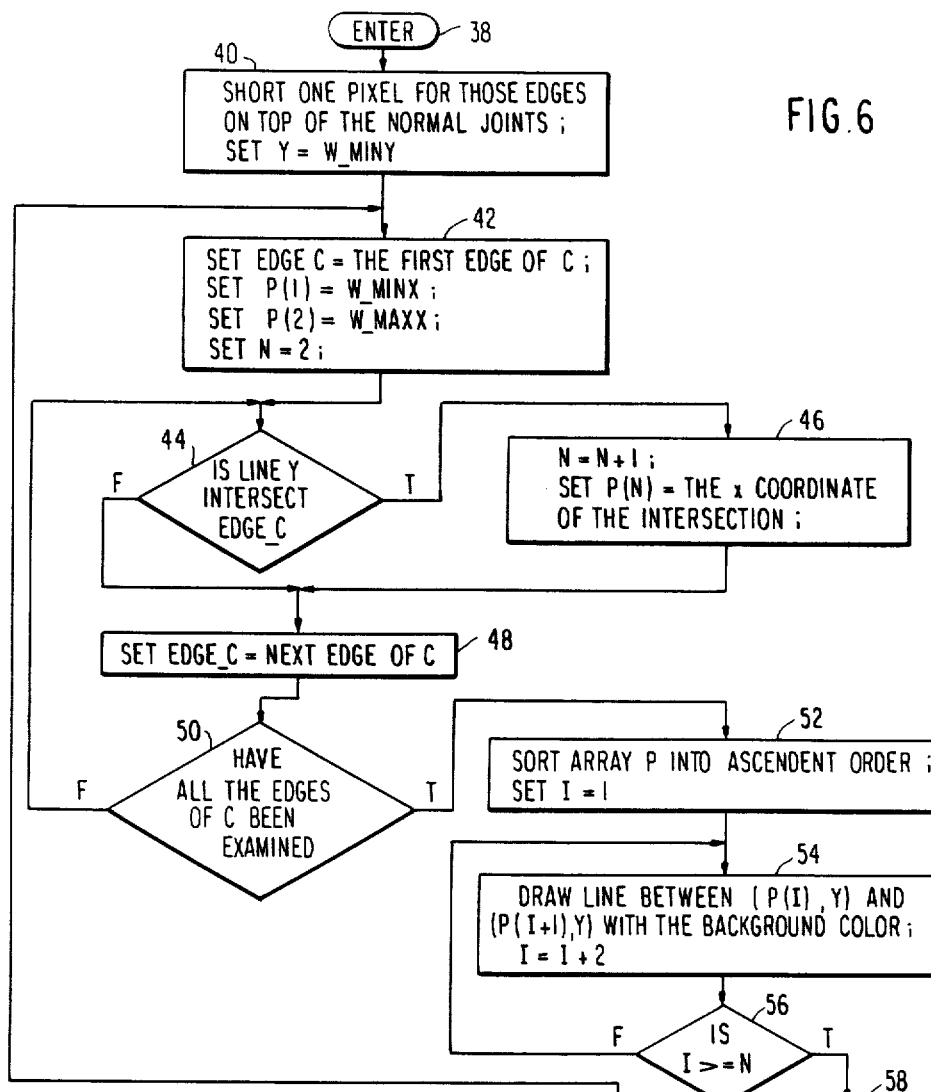
FIG. 6 is a flow chart for the algorithm which computes and erases a portion of the graphic outline.

The flow chart for the algorithm which computes and erases the removed portion is shown in FIG. 6. The process is entered at block 38 and the first function performed in block 40 is to short all the lines in the cutting polygon which are on top of a normal joint by one pixel. The purpose of this, as just explained, is to avoid generating two points at the normal joint. Y is initialized to the topmost y coordinate of the window. In block 42, EDGE C is set to the first edge of the cutting polygon. The first entry of the array P contains the leftmost x coordinate of the window, and the second entry of the array P contains the rightmost x coordinate of the window. The total number of intersections N is also initialized to two which now contains two points; the left edge of the window and the right edge of the window. In decision block 44, a test is made to determine if line Y intersects with EDGE C. If it does, then N is incremented by one and the x coordinate of that intersection is stored in the array P indexed by N as indicated by block 46. After that or if the test in decision block 44 is false, EDGE C is assigned to the next edge of the cutting polygon in block 48. Decision block 50 determines if all the edges of the cutting polygon have been examined. If not, control loops back to decision block 44; otherwise, control goes to block 52. In block 52, appray P is sorted into ascending order and counter I is set to the odd number "1". The control then goes to block 54 which draws a line between the odd number point (P(I),Y) and the even number point (P(I+1),Y) with the background color. I is then incremented by two which sets it to the next odd number. Then in decision block 56, I is tested to see if it is either greater than or equal to the total number of intersections N. If not, control loops back to block 54; otherwise, control goes to block 58 which increments Y by one. Y is then tested in decision block 60 to determine if Y is greater than the bottom edge of the window. If not, control loops back to block 42; otherwise, all the portions to be removed have been removed from the display and the process exits at block 62.

The following code in Program Design Language (PDL), from which source and object code can be readily be derived, implements the process shown in the flow chart of FIG. 6:

```
Define: W_MINX = the minimum window x coordinate
        W_MINY = the minimum window y coordinate
        W_MAXX = the maximum window x coordinate
        W_MAXY = the maximum window y coordinate
SHORT ONE PIXEL FOR THOSE EDGES ON TOP OF
                NORMAL JOINTS
INITIAL Y = W_MINY
REPEAT
   INITIAL EDGE_C = THE FIRST EDGE OF CUTTING
                    POLYGON
    SET P(1) = W_MINX
    SET P(2) = W_MAXX
    INITIAL N = 2
    REPEAT
      IF LINE Y INTERSECTS EDGE_C THEN
         N = N + 1
         P(N) = THE X COORDINATE OF THE INTERSECTION
      ENDIF
      SET EDGE_C = THE NEXT EDGE OF THE CUTTING
                   POLYGON
    UNTIL ALL THE EDGES OF THE CUTTING POLYGON
    HAVE BEEN EXAMINED
    SORT ARRAY P INTO ASCENDING ORDER
    INITIAL I = 1
    REPEAT
      DRAW A LINE BETWEEN (P(I),Y) AND (P(I+1),Y)
         WITH THE SAME BACKGROUND COLOR
      INCREMENT I BY 2
    UNTIL I >= N
    INCREMENT Y BY 1
UNTIL Y > W_MAX
```

If there are other windows under the cut window, then those points which define the removed portion are used to redisplay the image of the underneath window. The algorithm of doing this is similar to erasing the removed portion; that is, instead of erasing every pixel from the screen, the contents of the bottom window for those pixels (either on or off) is redisplayed on the screen. For better performance, those redisplayed portions can be divided into a collection of rectangular shapes which can speed up the screen update. If the window under it contains text objects, then text reformatting may be necessary. Reformatting the text object is equivalent to finding the additional text space available and flowing text characters into it.

Figure 7:
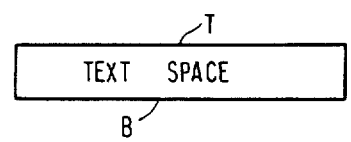
FIG. 7 is an illustration of the "text space" as defined by the invention to provide the flow of text in and around the graphic object.
Figure 8:
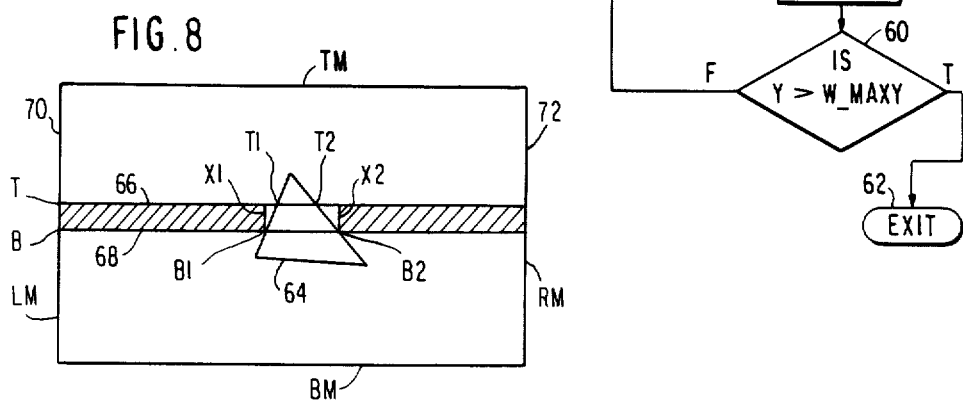
FIG. 8 illustrates a triangular shaped window and the available text space which is available on a line which intersects the window.

In FIG. 7, the "text space" is defined as a rectangular area in which text characters can be placed. This "text space" defines a "top line" T to be the line on top of the text space and a "bottom line" B to be the line on the bottom of the text space. FIG. 8 shows a triangular shaped window 64 which intersects with text line defined by top line 66 and bottom line 68. The shaded portions between the left margin 70 and the right margin 72 on the line are the available text space for that line.

The algorithm which allows the text to flow into the irregularly shaped window computes all the available text space on both sides of the graphic object on the page. Assume that the page contains n text spaces with TM as the top margin, BM as the bottom margin, LM as the left margin, and RM as the right margin. The flow chart is shown in FIG. 9.

The process is entered at block 74, and in block 76, variable T is assigned as the top margin, and B is assigned as T + character height. Line T is then tested in decision block 78 to see if it intersects with the window. If it does, then in block 80, T1 is computed as the intersection point on the left side of the window, and T2 is computed as the intersection point on the right side of the window. If the test in decision block 78 is false, then in block 82, T1 is assigned to the right margin and T2 is assigned to the left margin. The B line is then tested in decision block 84 to see if it intersects with the window. If it does, then in block 86, B1 is computed as the intersection point on the left side of the window, and B2 is computed as the intersection point on the right side of the window. If the test in decision block 84 is false, then in block 88, B1 is assigned to the right margin and B2 is assigned to the left margin. If either T or B intersects with the window as determined in decision block 90, then in block 92, X1 is assigned as the minimum of T1 and B1, and X2 is assigned as the maximum of T2 and B2. The available text space which lies between the left margin and X1, and between X2 and the right margin is found. If it is determined in decision block 90 that neither T nor B intersects with the window, then in block 94, the available text space is the whole line from the left margin to the right margin. In block 96, the text characters are then put into the available text space, and both T and B are incremented by the character height. T is then tested in decision block 98 to determine if T is equal to the bottom margin. If T is equal to the bottom margin, then control exits at block 100; otherwise, control loops back to decision block 78 and the process continues from there.

Figure 9:
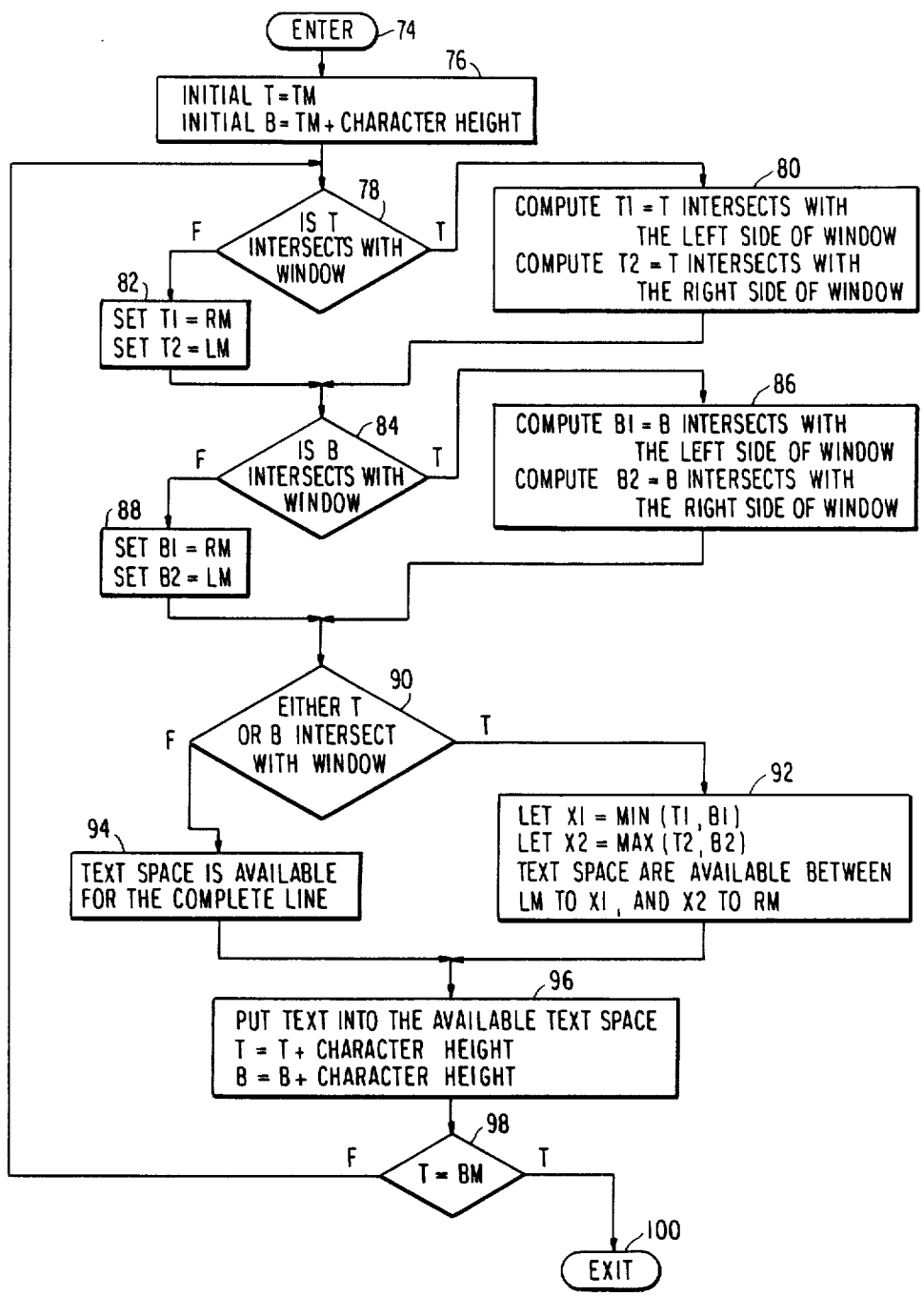
FIG. 9 is a flow chart of the text flow process according to the present invention.

The following code is written in Program Design Language (PDL) and implements the process shown in the flow chart of FIG. 9. As before, source code and object code can easily be derived from the PDL code.

```
INITIAL T = TM
INITIAL B = TM + CHARACTER_HEIGHT
REPEAT
   IF T INTERSECTS WITH WINDOW THEN
      COMPUTE T1 = T [intersection with left side
         of window]
      COMPUTE T2 = T [intersection with right side
         of window]
   ELSE
      SET T1 = RM
```

```
        SET T2 = LM
     ENDIF
     IF B INTERSECTS WITH WINDOW THEN
        COMPUTE B1 = B [intersects with left side
           of window]
        COMPUTE B2 = B [intersects with right side
           of window]
     ELSE
        SET B1 = RM
        SET B2 = LM
     ENDIF
     IF EITHER T OR B INTERSECT WINDOW THEN
        SET X1 = MIN(T1,B1)
        SET X2 = MIN(T2,B2)
        [available text space between LM and X1 and
           X2 and RM]
     ELSE
        [available text space is the whole line]
     ENDIF
     PUT TEXT INTO AVAILABLE TEXT SPACE
     INCREMENT T BY CHARACTER HEIGHT
     INCREMENT B BY CHARACTER HEIGHT
UNTIL T = BM
```

The foregoing code begins by initializing the variables T and B for the top and bottom lines of a line of text space as illustrated in FIGS. 7 and 8. The top line is set to the top margin (TM) of the page, and the bottom line is set top line plus the height of the characters in the line of text. As the process increments down the page, the top and bottom lines will be incremented by the character height so that the spacing between the top and bottom lines is maintained through the whole length of the page, the end of which is determined by the bottom margin.

The process next tests the top line to determine if it intersects with the graphic object window. If it does, the intersection with the left side of the window is computed (COMPUTE T1) as is the intersection with the right side of the window (COMPUTE T2). Otherwise, T1 is set to the right margin (RM), and T2 is set to the left margin (LM). The bottom line is then texted to determine it it intersects with the graphic object window. If it does, the intersection with the left side of the window is computed (COMPUTE B1) as is the intersection with the right side of the window (COMPUTE B2). Otherwise, B1 is set to the right margin (RM), and B2 is set to the left margin (LM).

If either the top or the bottom line of a line of text intersect with the graphic object window, the right margin of the text space (X1) is set to the minimum of the computed or set values of T1 and B1 (SET X1=MIN(T1,B1). Similarly, the left margin of the text space (X2) is set to the minimum of the computed or set values of T2 and B2 (SET X2=MIN(T2,B2). The available text space for this particular line of text is now defined as being between the left margin (LM) and X1 and X2 and the right margin (RM). On the other hand, if neither of the top or bottom line of the text space illustrated in FIG. 3 intersects the graphic object window, then the available text space is the whole line.

Once the available text space for a particular line has been determined, then text is put into the available space. Then the process repeats incrementing the values for the top and bottom line for the next line of text. The process ends when the next incremented value of the top line is equal to the bottom margin (BM). FIG. 8 shows a triangle shaped window which intersects with lines T and B. The shaded portions between the left margin LM and line X1 and between the line X2 and the right margin RM on the line are the available text space for line B.

While the invention has been described in terms of a single implementation of a preferred embodiment, those skilled in the art will understand that the invention can be practiced with modification and variation without departing from the scope of the invention as defined in the appended claims.

Having thus described my invention, what I consider to be new and desire to secure by Letters Patent is as follows:

1. In a mixed data editor implemented on a computer which produces a compound document having text and graphic objects positioned on the same page of the document, said editor manipulating text and graphic object sets containing said text and graphic objects, respectively, said text object set being provided with a flow attribute which, when set on, causes text of the text object set to flow around a graphic object set, the process wherein text flows in as well as around an irregularly shaped graphic object comprising the steps of:
   displaying said irregularly shaped graphic object in a rectangular window;
   drawing by said editor a polygon around said irregularly shaped graphic object;
   clipping by said editor said polygon with said rectangular window to produce an irregularly shaped window which conforms to the general shape of the irregularly shaped graphic object;
   determining in said editor on a line by line basis the boundaries of lines of text in text space which intersect with the defined irregularly shaped window thereby determining available text space around the irregularly shaped object; and
   placing by said editor text into available text space including both those lines of text which intersect with the defined irregularly shaped window and those lines of text which do not intersect with the defined irregularly shaped window.

2. The process of flowing text in and around an irregularly shaped graphic object on a page of a document as recited in claim 1 wherein the step of determining the boundaries of lines of text which intersect the irregularly shaped window comprises the steps of:
   defining by said editor top and bottom lines of a line of text;
   computing in said editor first and second values of the intersections of the top line of the text with the left and right sides, respectively, of the irregularly shaped window, but if the top line does not intersect with the irregularly shaped window, setting the first and second values equal to right and left margins, respectively, of the page;
   computing in said editor third and fourth values of the intersections of the bottom line of the text with the left and right sides, respectively, of the irregularly shaped window, but if the bottom line does not intersect the irregularly shaped window, setting the third and fourth values to right and left margins, respectively, of the page; and
   selecting by said editor the minimum values of the first and third values and the second and fourth values, respectively, as boundaries of a line of text which intersects the irregularly shaped window.

3. The process of flowing text in and around an irregularly shaped graphic object on a page of a document as recited in claim 1 wherein said step of clipping is performed by the steps of:

displaying said rectangular window; and erasing by said editor that portion of the rectangular window removed by said polygon.

4. A method performed by a mixed object data editor implemented on a computer of flowing text around irregularly shaped graphic objects on a document comprising the steps of:

displaying said irregularly shaped graphic object in a rectangular window;

drawing by said editor a polygon around said irregularly shaped graphic object;

clipping by said editor said polygon with said rectangular window to produce an irregularly shaped window conforming to said irregularly shaped graphic object on a document on which text appears;

determining in said editor on a line by line basis the available space for text of each line of text which intersects said irregularly shaped window; and causing by said editor said text to fill the available space for text on each said line.

5. The process of flowing text in and around an irregularly shaped graphic object on a page of a document as recited in claim 4 wherein the step of determining the available space for text which intersect the irregularly shaped window comprises the steps of:

defining by said editor top and bottom lines of a line of text;

computing by said editor first and second values of the intersections of the top line of the text with the left and right sides, respectively, of the irregularly shaped window, but if the top line does not intersect with the irregularly shaped window, setting the fist and second values equal to right and left margins, respectively, of the page;

computing by said editor third and fourth values of the intersections of the bottom line of the text with the left and right sides, respectively, of the irregularly shaped window, but if the bottom line does not intersect the irregularly shaped window, setting the third and fourth values to right and left margins, respectively, of the page; and selecting by said editor the minimum values of the first and third values and the second and fourth values, respectively, as boundaries of a line of text which intersects the irregularly shaped window.

* * * * *